United States Patent [19]

Taki et al.

[11] Patent Number: 5,093,792
[45] Date of Patent: Mar. 3, 1992

[54] COMBUSTION PREDICTION AND DISCRIMINATION APPARATUS FOR AN INTERNAL COMBUSTION ENGINE AND CONTROL APPARATUS THEREFOR

[75] Inventors: Masahiro Taki; Matsuei Ueda, both of Aichi, Japan

[73] Assignee: Kabushiki Kaisha Toyota Chuo Kenkyusho, Aichi, Japan

[21] Appl. No.: 359,705

[22] Filed: May 31, 1989

[30] Foreign Application Priority Data

May 31, 1988 [JP] Japan ................. 63-133036

[51] Int. Cl.$^5$ .............................................. G06F 15/48
[52] U.S. Cl. ................... 364/431.01; 364/431.08
[58] Field of Search ............ 364/431.01, 431.05, 364/431.07, 431.08; 73/118.2; 123/488, 494

[56] References Cited

U.S. PATENT DOCUMENTS

| | | | |
|---|---|---|---|
| 4,660,166 | 4/1987 | Hopfield | 364/807 |
| 4,736,302 | 4/1988 | Kinugawa et al. | 364/431.05 |
| 4,807,151 | 2/1989 | Citron | 364/431.05 |
| 4,903,668 | 2/1990 | Ohata | 364/431.05 |
| 4,928,653 | 5/1990 | Ohkubo et al. | 364/431.05 |
| 4,928,655 | 5/1990 | Kako | 364/431.05 |

FOREIGN PATENT DOCUMENTS 61-13126 1/1986 Japan .
62-30932 2/1987 Japan .

OTHER PUBLICATIONS

Letters to Nature, vol. 323, Oct. 9, 1986, pp. 533-536, D. E. Rumelhart et al.
SAE Technical Paper Series, "Computerized Knock Detection from Engine Pressure Records", 1986, pp 1-11, M. D. Checkel et al.

Primary Examiner—Salvatore Cangialosi
Attorney, Agent, or Firm—Oblon, Spivak, McClelland, Maier & Neustadt

[57] ABSTRACT

An apparatus for predicting and discriminating whether or not misfire, knocking and the like will occur from the cylinder pressure before the occurrence of the misfire, the knocking and the like by the use of a three layered neural network. The cylinder pressure signal detected by a cylinder pressure sensor is sampled and input to each of the elements of the input layer. The signal then is modulated corresponding to the strength (weight) of the connection between each of the elements, and transmitted to the hidden and output layers. The magnitude of signal from the elements of the output layer represents the prediction and discrimination results. The weight is learned and determined by a back propagation method.

19 Claims, 8 Drawing Sheets

FIG. 13

COMBUSTION PREDICTION AND DISCRIMINATION APPARATUS FOR AN INTERNAL COMBUSTION ENGINE AND CONTROL APPARATUS THEREFOR

BACKGROUND OF THE INVENTION

1. Field of the Invention

The present invention relates to a combustion prediction and discrimination apparatus for an internal combustion engine for predicting burning conditions by calculations based on one portion of the cylinder pressure information, as well as a control apparatus using the combustion prediction and discrimination apparatus.

2. Related Art

For conventional burning condition discrimination apparatuses, apparatuses utilizing a knock sensor, a cylinder pressure sensor, an ion gap sensor and an $O_2$ sensor have been widely used.

The knock sensor used for detecting vibration due to knocking is normally attached to the internal combustion engine cylinder block to detect the pressure vibrations accompanying the occurrence of knocking as vibration of the cylinder wall. However, in case of using this type of knock sensor, the knocking can not be discriminated to have occurred until the cylinder block vibrates abnormally due to the occurrence of knocking. Therefore, it is impossible to predict the occurrence of knocking from data related to the initial combustion stage.

With the cylinder pressure detection sensor technique for detecting the cylinder pressure vibrations accompanying knocking (Japanese Patent Application Laid-Open No. 61-13126), knocking can be discriminated to have occurred only after the sudden occurrence of cylinder pressure vibrations. Thus, the occurrence of knocking cannot be predicted before the occurrence of knocking.

Also, the technique for detecting misfire using the cylinder pressure detection sensor (Japanese Patent Application Laid-Open No. 62-30932) has the following difficulty. If, after ignition, the flame spreads and then the flame growth stops to cause misfire, it will be difficult to discriminate misfire since the cylinder pressure before misfire resembles that of the normal burning.

Further, when detecting misfire by the ion gap sensor, the general technique is to have the sensor disposed inside the combustion chamber and to discriminate misfire based on whether or not the flame has reached a predetermined position within a predetermined time after spark ignition. However, in case of using the ion gap sensor, misfire is discriminated only when the flame has not reached the predetermined position in the predetermined time. Therefore, misfire cannot be predicted from combustion data of the initial burning period. Moreover, when the flame is stratified in one region of the combustion chamber, then, depending on the position of attachment of the sensor, it becomes impossible to detect the occurrence of misfire in some cases.

Still further, the $O_2$ sensor which measures the air/fuel ratio of the internal combustion engine, is normally fitted to the engine exhaust pipe and by detecting the oxygen concentration in the exhaust gas the air/fuel ratio at the time of burning can be discriminated. However, when using the $O_2$ sensor, it becomes possible to discriminate the air/fuel ratio only after the burning is finished and the exhaust gas is exhausted in the exhaust pipe. Further, since the response speed of the $O_2$ sensor is slow, it is impossible to discriminate the air/fuel ratio before one burning cycle is finished or immediately thereafter. Moreover, in the case of application to multi-cylinder engines, it is impossible to discriminate each of the air/fuel ratios of the different cylinders independently.

As stated above, in the conventional technology, since there is either a problem of the validity and responsiveness of the burning condition sensor itself, or a problem with signal processing methods, the burning conditions of the cycle are discriminated by measuring the burning conditions over one complete burning period, either from the time of completion of burning or from the first occurrence of abnormal burning.

Accordingly the problem with the conventional technology is that it is impossible to predict the following burning conditions from the data of a portion of the burning within one cycle.

SUMMARY

The present invention provides a way to solve the above problems.

It is an object of the present invention to provide a combustion prediction and discrimination apparatus for an internal combustion engine wherein only by carrying out measurement of one part of the burning period of the burning cycle, the subsequent burning conditions of the said cycle can be obtained by computation and the complete burning conditions of the said cycle can be predicted and discriminated.

It is a further object of the present invention to provide a control apparatus for controlling an engine based on the burning conditions predicted and discriminated by using the combustion prediction and discrimination apparatus.

Figure 1:
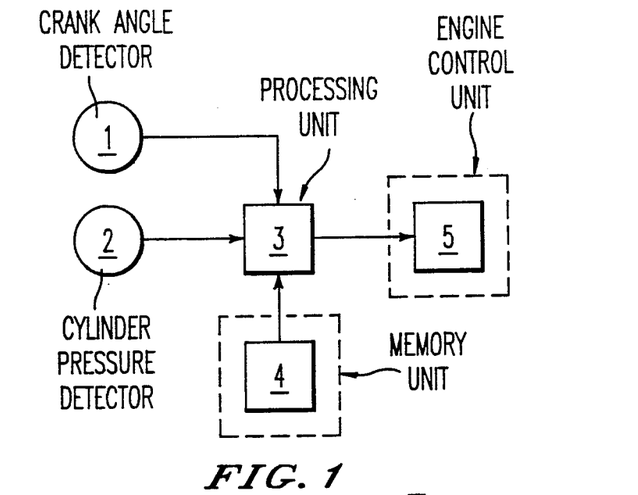
FIG. 1 is a block diagram showing an overall construction of the present invention.

To achieve the above objects, the combustion prediction and discrimination apparatus of the present invention as shown in FIG. 1, comprises; means 1 for detecting the crank angle to output a crank angle signal; means 2 for detecting cylinder pressure to output a cylinder pressure signal; and means 3 for predicting and discriminating burning conditions, having a network constituted by multi-connected calculating elements, each of which outputs a non-linear transformation of a sum obtained from multiplying each of a plurality of inputs to each of the multi-connected calculating elements by a weight and adding the multiplied results, wherein the weight is determined to cause the final output of the network to correspond to the burning conditions to be predicted and discriminated on the basis of the information of a cylinder pressure synchronized with the crank angle in a part of a whole period of the burning conditions to be predicted and discriminated, whereby the burning conditions are predicted and discriminated on the basis of the magnitude of the final output obtained by inputting one part of the pressure signal in synchronization with the crank angle signal. Also, a control apparatus according to the present invention is provided with means 5 for controlling an engine on the basis of the results discriminated by the combustion prediction and discrimination apparatus in addition thereto.

With the combustion prediction and discrimination apparatus of the present invention constructed as above, the burning condition of the internal combustion engine combustion conditions can be predicted as follows. In the prediction and discrimination means, from the outputs of the crank angle detecting means 1 and the cylinder pressure detecting means 2 is selected the cylinder pressure synchronized with the crank angle for a predetermined period of the crank angle corresponding to one part of the burning period, which corresponds to a predetermined burning condition to be expected to be predicted and discriminated, and this becomes the target cylinder pressure for the prediction and discrimination. This target prediction and discrimination cylinder pressure is input to the prediction and discrimination means and multiplied by the weight adjusted to correspond to the expected burning condition, and then after adding the multiplied results the sum is transformed by a non-linear ability, and depending on the magnitude of the last obtained output value, the subsequent burning condition can be predicted and discriminated from one portion of the burning condition.

In the engine control apparatus of the present invention, the engine is controlled based on the results of the above combustion prediction and discrimination apparatus.

The present invention can obtain the following effects by operation as explained above.

In the present invention the complete burning condition of one burning cycle in the internal combustion engine can be previously predicted and discriminated from one part of the one burning cycle and a judgement output corresponding to the burning condition can be obtained. By use of this judgement output, control of the engine running conditions can be carried out quicker and more precisely.

Moreover, in the present invention, since various burning conditions can be predicted and discriminated from detection of the cylinder pressure, conventionally provided special sensors such as the knock sensor, the $O_2$ sensor, the ion gap sensor, the combustion illumination sensor and the like, for discriminating the burning condition can be eliminated. Also it is possible to have a simple engine control system accompanied with a high degree of control.

With the processing unit as the prediction and discrimination means for carrying out prediction and discrimination of burning conditions of various kinds, any style of calculator can be used. For example, when using a calculator with a learning ability, the various combustion predictions and discriminations can be carried out by using the same processing units and by only changing the weight of the cylinder pressure for processing control regulation. Accordingly, it becomes possible to simplify the processing unit, to reduce costs due to sharing the processing unit, and to condense the development of programs for prediction and discrimination. Moreover, when there are a plurality of processing units, it is possible to substitute another processing unit in the event of breakdown. Concerning the processing unit, a neural computer composed of a neural network can be used.

In the present invention, by adjustment of a value of a weight in the processing unit to match the burning condition to be predicted and discriminated, various burning conditions can be predicted and discriminated without changing the basic construction. The adjustment of the weight can be conducted by a method in which the weight is changed while searching for a suitable output value by an experiment independent from the present invention, described below. With regard to the later processing, this can be carried out either after cylinder pressure detection, or at the same time as cylinder pressure detection. Below is an explanation of the other preferred embodiments of this invention.

The object of a second aspect of this invention is the prediction and discrimination of abnormal combustion in an internal combustion engine.

The characteristic feature of a second aspect is as follows:

Typical wave forms of the cylinder pressure during the normal and abnormal combustion are analyzed as cylinder pressures for adjusting the processing and using these wave forms the weight necessary for prediction and discrimination of abnormal combustion in the processing unit is adjusted so as to be capable of predicting the abnormal combustion, or the weight is obtained from an independent experiment. Then the processing unit is used which has been adjusted so as to be capable of predicting and discriminating whether or not the abnormal combustion will subsequently occur from the progress of the cylinder pressure before the occurrence of the abnormal combustion.

That is to say, in the second aspect of this invention, the data of cylinder pressure synchronized with the crank angle is measured in an initial combustion stage before the occurrence of the abnormal combustion and input to the processing unit for calculation. Depending on this calculation, the subsequent abnormal combustion occurrence can be predicted and discriminated before it happens. Consequently, since the judgement output corresponding to the burning conditions can be obtained in the initial combustion stage, then using this judgement output, it is possible to provide control to ensure that the abnormal combustion does not occur during the running of the engine. This judgement output can also be used to improve output power and specific fuel consumption and reduce the amount of exhaust pollutant.

The object of a third aspect of the present invention is to predict and discriminate knocking of the internal combustion engine. A third aspect represents a more concrete characteristic feature of the second aspect. The 3rd embodiment is characterized as constructed as follows:

Typical wave forms of the cylinder pressure during normal combustion and knocking are analyzed as cylinder pressure for adjusting the processing and using these wave forms, the weight necessary for prediction and discrimination of knocking in the processing unit is adjusted so as to be capable of predicting the knocking, or the weight is obtained from an independent experiment. Then the processing unit is used which has been adjusted so as to be capable of predicting and discriminating whether or not knocking will subsequently occur from the progress of the cylinder pressure before the occurrence of the knocking.

Figure 2:
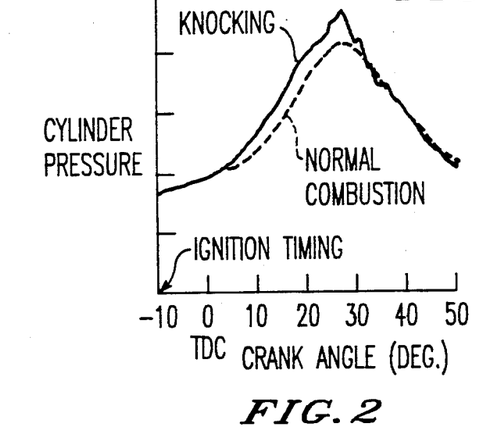
FIG. 2 is a graph showing cylinder pressure under normal conditions and during knocking.

FIG. 2 shows the cylinder pressure wave forms in the cases of knocking and the normal combustion. Usually, a spark ignition is conducted a little before TDC (Top Dead Center) and the knocking occurs a little after TDC. In the case of knocking, the wave form of the cylinder pressure which occurs before knocking shows an increase in the rate of pressure rise from TDC to 10° after TDC. Subsequently the pressure wave form is accompanied by pressure vibrations characteristic of knocking.

With the third aspect, from a part of the cylinder pressure in the initial combustion stage, the differences in wave form between knocking and the normal combustion, i.e. the differences in change of the cylinder pressure therebetween, are detected, and it can be predicted and discriminated whether or not there will be knocking.

That is to say, in the third aspect of the present invention, the cylinder pressure synchronized with the crank angle in the initial combustion stage before the occurrence of knocking is input to the processing unit for processing, and depending on this processing subsequent knocking occurrence can be predicted and discriminated before it happens, and a judgement output corresponding to the burning condition can be obtained.

Using this judgement output, it is possible to provide engine control to ensure that knocking does not occur during the running of the engine, thereby improving engine endurance as well as output power, specific fuel combustion, and the reduction of the amount of exhaust pollutant.

The object of a fourth aspect of the present invention is to predict and discriminate misfire of an internal combustion engine. A fourth aspect represents a more concrete characteristic feature of the second aspect. The embodiment is characterized as constructed as follows:

Typical wave forms of the cylinder pressure during normal combustion and misfire are analyzed as cylinder pressure for adjusting the processing and using these wave forms, the weight necessary for prediction and discrimination of misfire in the processing unit is adjusted for prediction of misfire, or the weight is obtained from an independent experiment. Then the processing unit is used which has been adjusted so as to be capable of predicting and descriminating whether or not misfire will subsequently occur from the progress of the cylinder pressure before the occurrence of misfire.

Figure 3:
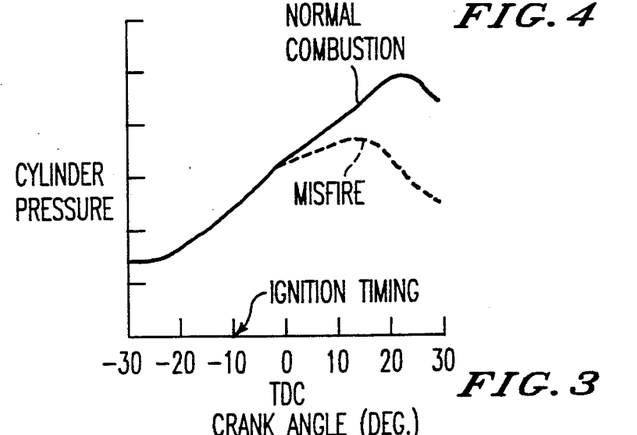
FIG. 3 is a graph showing cylinder pressure under normal conditions and during misfire.

FIG. 3 shows the cylinder pressure wave forms in the cases of a weak combustion accompanying misfire and normal combustion. As can be seen, even in case that a poor burning occurs after the burning progresses fairly, the wave form of the cylinder pressure in the period from TDC to 10° after TDC differs between the case that the cylinder pressure in the initial combustion stage results in misfire and the case that it reaches a normal combustion. In the case of the occurrence of misfire the rate of the cylinder pressure rise is smaller.

With the fourth aspect, the difference in wave form of the cylinder pressure in the initial combustion stage is detected and it can be predicted and discriminated whether or not there will be misfire.

That is to say, in the fourth aspect of the present invention, the cylinder pressure synchronized with the crank angle in the initial combustion stage before the occurrence of misfire is input to the processing unit for processing, and depending on this processing, subsequent misfire occurrence can be predicted and discriminated before it happens. A judgement output corresponding to the burning condition can then be obtained.

Using this judgement output for controlling an engine, it is possible to ensure that misfire does not occur during engine running, thereby improving engine output power, specific fuel combustion, as well as the reduction of the amount of exhaust pollutant.

The object of a fifth embodiment is to predict and discriminate A/F (air-fuel ratio) of an internal combustion engine.

The characteristic feature of a fifth aspect is that a typical wave form of the cylinder pressure of A/F to be predicted and discriminated is analyzed as a cylinder pressure for adjusting the processing unit, and using these wave forms the weight necessary for prediction and discrimination of A/F in the processing unit is adjusted for prediction of A/F or the weight is obtained from an independent experiment, and the processing unit is used having the weight which has been adjusted so as to be capable of operating subsequent burning condition from the progress of the cylinder pressure before completion of the burning and predicting and discriminating A/F.

Figure 4:
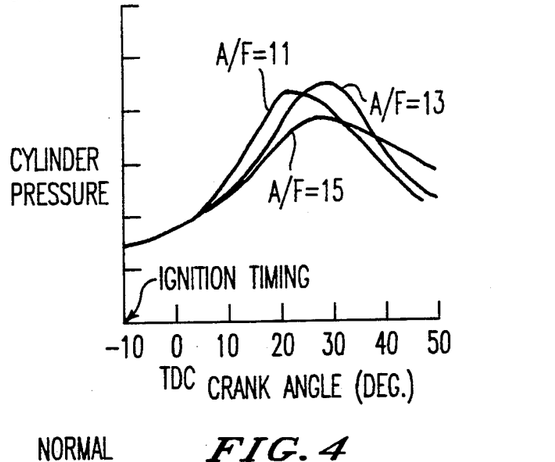
FIG. 4 is a graph showing cylinder pressure change with a change in air fuel ratio.

FIG. 4 shows an example of the change in cylinder pressure in accordance with change in A/F.

With the fifth aspect, as shown in FIG. 4, the wave form of the cylinder pressure when the A/F is small is high over the initial combustion stage (from 10°-20° after TDC), and correspondingly lower over the later combustion stage (40° or more after TDC). With large A/F the cylinder pressure over the initial combustion stage is low and conversely is higher over the later combustion stage. This condition is utilized, and by the difference in the wave form of the cylinder pressure, the A/F can be predicted and discriminated.

That is to say in the fifth aspect of this invention, the cylinder pressure synchronized with the crank angle before completion of combustion is input to the processing unit for processing, and depending on this processing, subsequent burning condition is operated and the A/F can be predicted and discriminated, and a judgement output corresponding to the A/F can be obtained. Using this judgement output for engine control, A/F control can be promptly performed and control accuracy can also be improved, thereby improving engine output power, specific fuel consumption, and the reduction of the amount of exhaust pollutant. Moreover, in applying this embodiment to A/F control on a multi cylinder engine, since the A/F of the individual cylinders can be predicted and discriminated, A/F control accuracy can be markedly improved.

Further, with this fifth aspect of the present invention it goes without saying that A/F can also be discriminated by the operation based on an input of the cylinder pressure including a portion of the cylinder pressure after completion of combustion.

The object of a sixth aspect of this invention is to carry out prediction and discrimination for the control of ignition timing or fuel-injection timing of an internal combustion engine.

The characteristic feature of the sixth aspect is as follows:

Typical wave forms of the cylinder pressure for the cases of ignition timing or fuel-injection timing for the occurrence of maximum torque, and ignition timing or fuel-injection timing advanced and retarded from this are analyzed as a cylinder pressure for adjusting processing. Using these wave forms, the weight necessary for prediction and discrimination of the ignition timing or the fuel-injection timing in the processing unit is adjusted for prediction of the ignition or fuel-injection timing or the weight is obtained from an independent experiment. Then the processing unit is used which is adjusted so that it can operate the later burning condition from the previous cylinder pressure progress before the completion of combustion, and predict and discriminate the ignition or fuel-injection timing.

With the sixth aspect of this invention, when the ignition or fuel-injection timing is advanced, the cylinder pressure in the initial combustion stage is high and that in the later combustion stage becomes correspondingly lower. In the case of the retarded ignition/fuel-injection timing, the cylinder pressure in the initial combustion stage is low and that in the later combustion stage becomes higher. Such characteristics of the wave forms of the cylinder pressure wave are used, and from the progress of the cylinder pressure, the difference in the wave forms is read and from this it can be predicted and discriminated whether or not the ignition or fuel-injection timing gives a maximum torque.

Consequently, with the sixth aspect of this invention it can be predicted and discriminated whether or not the ignition timing or fuel-injection timing will give the maximum torque, before completion of combustion. By use of this discriminated result the engine can be controlled giving a sufficient time margin for subsequent control, thereby enabling ignition or fuel-injection timing control to be promptly and accurately performed and improving engine output power, specific fuel consumption, and the reduction of exhaust pollutant. Further in this sixth aspect of the invention the ignition or fuel-injection timing can also be judged by operation based on an input of the cylinder pressure including a portion of the cylinder pressure after completion of combustion. Furthermore, the weight can be input to a memory unit 4 so as to be selected according to the burning condition to be predicted and discriminated.

DETAILED DESCRIPTION OF THE PREFERRED EMBODIMENTS

A combustion prediction and discrimination apparatus according to a first embodiment belongs to the third aspect of the present invention. The weight in an operational circuit is adjusted on the basis of typical cylinder pressures during knocking and normal combustion. The processing unit including the adjusted operational circuit is adjusted so as to be capable of predicting and discriminating from the progress of the cylinder pressure before the occurrence of knocking whether or not subsequent knocking will occur, by using the processing unit thus adjusted the occurrence of knocking is predicted from the cylinder pressure in the initial combustion stage. This will be explained in detail below with reference to FIG. 5 to FIG. 10.

Figure 5:
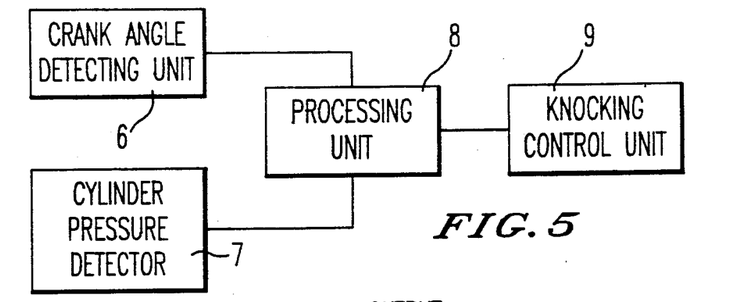
FIG. 5 is a block diagram of a knocking prediction unit of a first preferred embodiment in the present invention.
Figure 6:
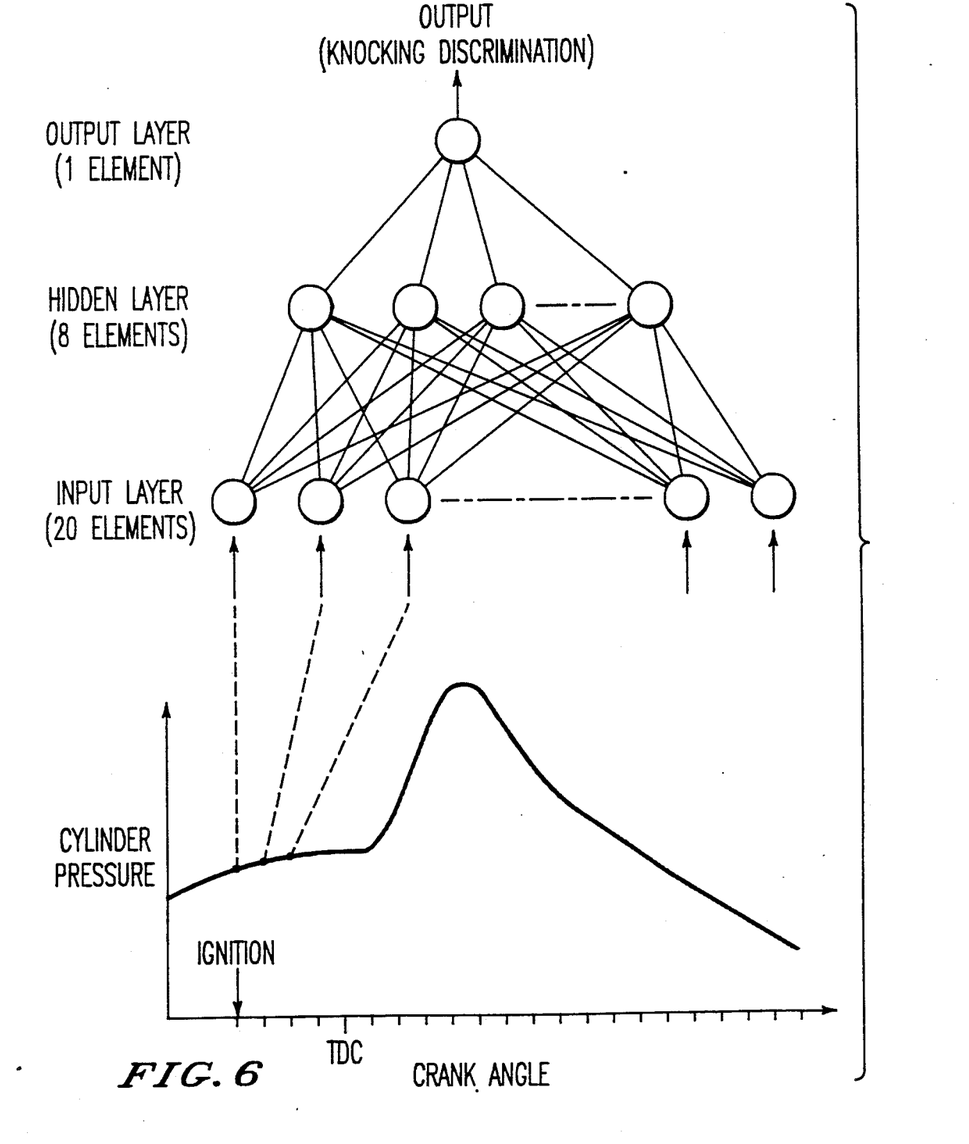
FIG. 6 shows a construction of a processing unit used in the example of FIG. 5.
Figure 7A:
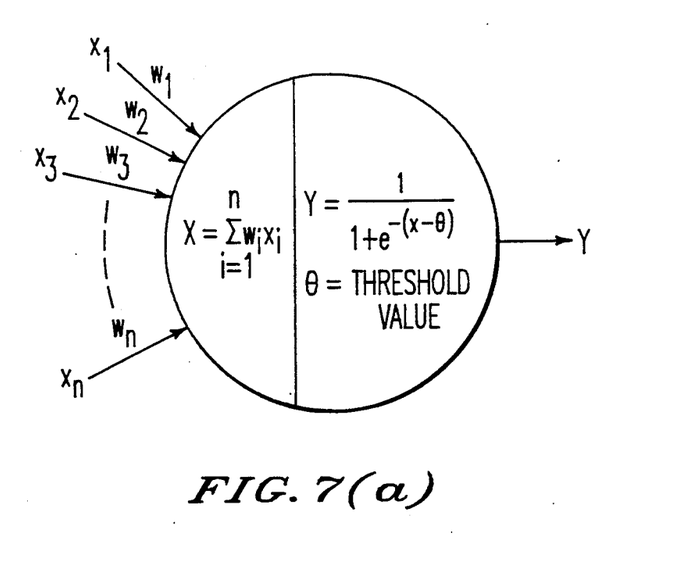
FIGS. 7a and 7b show the characteristics of the elements of the processing unit used in the example of FIG. 5.
Figure 7B:
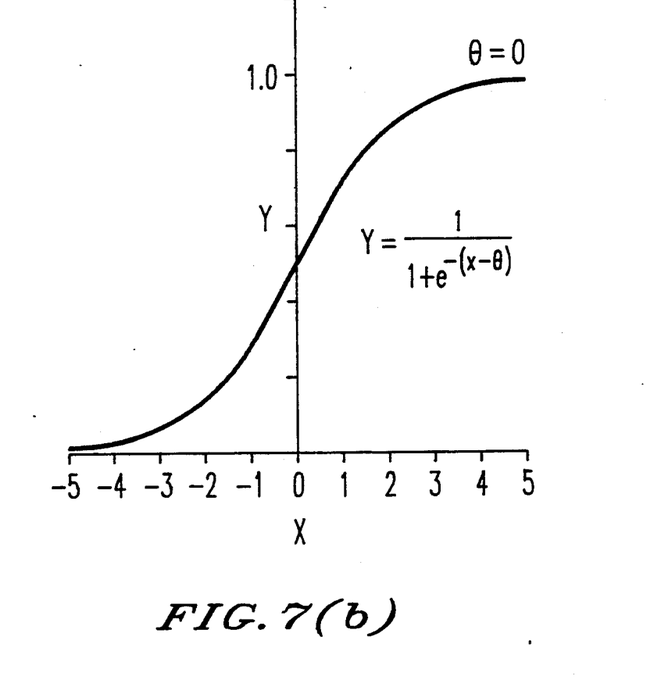

The construction of the first embodiment is shown in FIG. 5. A crank angle detecting unit 6 and a cylinder pressure detector 7 are used to sample the cylinder pressures at every 1° of crank angle from an initial spark signal to 20° of crank angle later, and data thus sampled is input into a processing unit 8 for processing and prediction of later burning condition is carried out by the processing. In the case that the occurrence of knocking is predicted, a knocking control unit 9 (a method such as dropping the compression ratio, injection of water or air into the combustion chamber, or use of an auxiliary spark plug at the edge of the combustion chamber, or the like) is operated. The processing unit 8 is constructed as a neural-network computer as shown in FIG. 6. The neural-network computer is constructed with an input layer having 20 elements, a hidden layer having 8 elements and an output layer having one element. Each element of the input layer inputs a signal to each element of the hidden layer, and each element of the hidden layer inputs a signal to the output layer. In the first preferred embodiment, only the input elements of the input layer have an input value X and output value Y related by Y=X. In the hidden and output layers, the operation shown in FIG. 7a is performed. With the operation of FIG. 7a an input X, a combined weight w, a number of inputs n, and an output Y and a threshold value θ are related by the equation;

$$X = \sum_{i=1}^{n} W_i X_i, \quad Y = \frac{1}{1 + e^{-(X-\theta)}} \quad (1)$$

and, by these equations the output y can be calculated. The hidden layer output X is obtained by extracting information of the characteristics of the wave forms of cylinder pressure. The output value Y is obtained from the finalized output value of information of the hidden layer output X, processed into an easily convergent form. The relation between the output Y and hidden layer output X is shown in FIG. 7b as a non-linear curve.

The combined weight w is adjusted as in the following "error back propagation method", on the basis of the typical cylinder pressures for the cases of knocking and normal burning condition that are used as the cylinder pressures in the processing adjustment.

Figure 8:
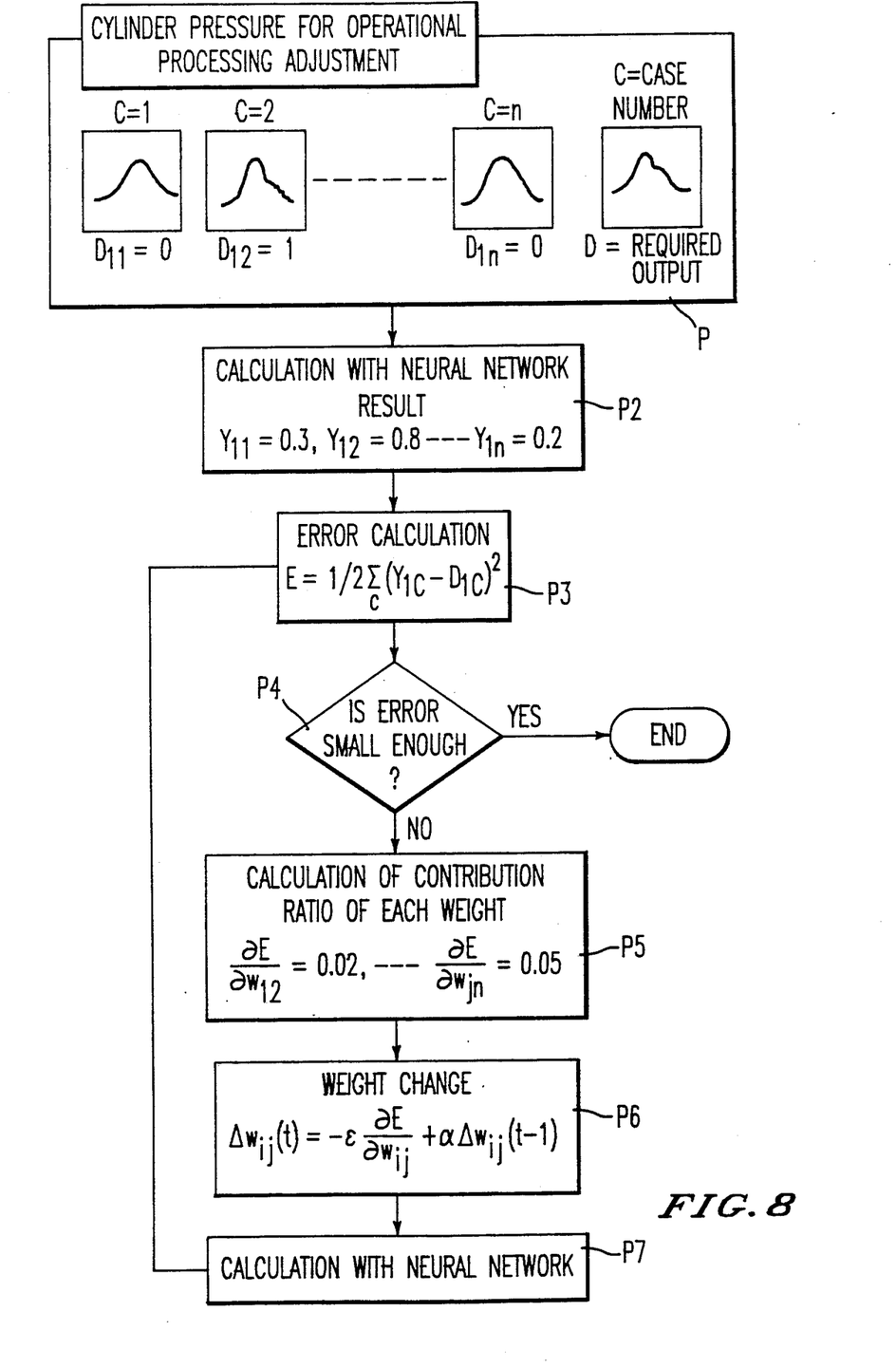
FIG. 8 is a flow chart of a weight adjustment method for the processing unit used in the example of FIG. 5.

FIG. 8 is a flow chart of the processing adjustment.

At first in step P1 several (n) typical cylinder pressure wave forms for normal combustion and knocking to be predicted and discriminated are prepared. Also the required output conditions ($D_{1c}$) (for example knocking time is 1, normal combustion time is O, C is 1,2 ... n) are determined so that they match the various cases.

Next, the data prepared in step $P_1$ is input to the input layer and the output $Y_{1c}$ is operated in step $P_2$. In this case the weight is given as a random number.

In step P3 the following amount is operated in the form of an error (E) from the result ($Y_{1c}$) obtained in step $P_2$ and the required output ($D_{1c}$) determined in step $P_1$.

$$E = \tfrac{1}{2} \sum_{c=1}^{n} (Y_{1c} - D_{1c})^2 \quad (2)$$

Then in step $P_4$, the magnitude of this error is judged and if the magnitude is small enough the weight adjustment is terminated. The weight at that time becomes the weight used in the actual prediction and discrimination. If the magnitude of E in step $P_4$ is still big, then in step $P_5$ the influence on the various weight errors is calculated. With this calculation method, first equation 3 is obtained from the differentiation of the above equation (2).

$$\frac{\partial E}{\partial Y_j} = Y_{1c} - D_{1c} \quad (3)$$

Here data of one of the specific wave forms is input, and since there is one element in the output layer, calculation is carried out for $j=1$.

$$\frac{\partial E}{\partial X_j} = \frac{\partial E}{\partial Y_j} \cdot \frac{\partial Y_j}{\partial X_j}$$

and substituting $Y_j(1-Y_j)$ from the above equation (1) for $dY_j/dX_j$ gives:

$$\frac{\partial E}{\partial X_j} = \frac{\partial E}{\partial Y_j} \cdot Y_j(1-Y_j)$$

Where in the contribution ratio of the combined weight ($W_{ij}$) between the i th element and j th element is as follows:

$$\frac{\partial E}{\partial W_{ij}} = \frac{\partial E}{\partial X_j} \cdot \frac{\partial X_j}{\partial W_{ij}}$$
$$= \frac{\partial E}{\partial X_j} \cdot y_i$$

Here, the output of the hidden layer is $y_i$.

Further, the contribution ratio of the hidden layer output $y_i$ given to the error (E) is:

$$\frac{\partial E}{\partial y_i} = \Sigma_j \frac{\partial E}{\partial X_j} \cdot \frac{\partial X_j}{\partial y_i}$$
$$= \Sigma_j \frac{\partial E}{\partial X_j} \cdot W_{ij}$$

Where the summation j covers all the connections of output $y_i$ to the next layer. The contribution ratios of the output layer and the hidden layer are output by the above method, but the connections before that are again partially differentiated according to $\partial E/\partial W_{ij}$ and $\partial E/\partial y_i$ and the contribution ratios are calculated.

In step $P_6$, the $\partial E/\partial W_{ij}$ obtained in step $P_5$ is used to change the weight. The amount of the weight change is given by;

$$\Delta W(t) = -\epsilon \frac{\partial E}{\partial W} + \alpha \Delta W(t-1)$$

Here, $\epsilon$ and $\alpha$ are coefficients, and $\Delta W(t-1)$ is the amount of weight changed one step before. This back propagation method is stated in detail in Nature vol. 323, Oct. 9, 1986 p. 533 to p. 535. The weight is changed according to the equation $w=w+\Delta w$. At this time, if w becomes close to 0 the connection is considered to disappear and can be cut off. After changing all the weights, the data of the previous step $P_1$ is used and again calculated according to step $P_7$.

The calculation from step $P_3$ to step $P_7$, is repeated until the error E becomes small enough giving the optimum weight.

By the above method, after adjustment of the combined weight, the weight is used for knocking prediction and discrimination.

At the time of prediction and discrimination, data of a portion of the combustion pressure wave form output from the cylinder pressure detector by the crank angle signal output from the crank angle detector as shown in FIG. 5, is extracted and input to the processing unit. The input combustion pressure is not transformed particularly in the elements of the input layer but is input to each element of the hidden layer as it is. In each element of the hidden layer, the input from each input layer element is multiplied by the weight adjusted as above, and the multiplied results are added. Then the sum is changed by a non-linear transformation, and subjected to the processing corresponding to that in the case where the input value x of FIG. 7a is more than one. As an example of this non-linear transformation, the logistic ability shown in FIG. 7b is given. In the output layer the inputs from the respective elements of the hidden layer are multiplied by the weight and the multiplied result are added. Then, the sum is transformed non-linearly and the final output value is obtained. The output value is below a certain value in the case of normal combustion (in the above example it is 0 or close to 0), and in the case of knocking it becomes a larger value (in the above example it is 1 or close to 1). That is to say, if this output value becomes above a certain value, knocking is predicted and discriminated to occur and the knocking control unit 9 is operated. In this case a signal for an auxiliary spark is input in an operation control circuit for a separately provided auxiliary spark plug to cause the auxiliary spark plug provided at the edge of the combustion chamber to spark so that the mixture which may be instantaneously burned by knocking becomes gradual combustion, thereby preventing the occurrence of knocking before it occurs.

Figure 9:
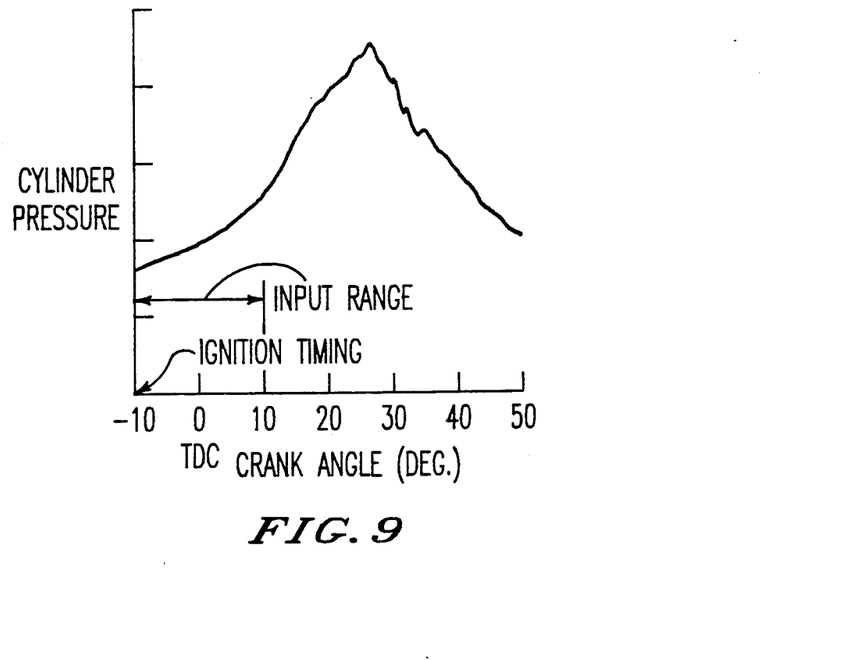
FIG. 9 shows the cylinder pressure of the cycle predicted as knocking by use of the unit of FIG. 5.
Figure 10:
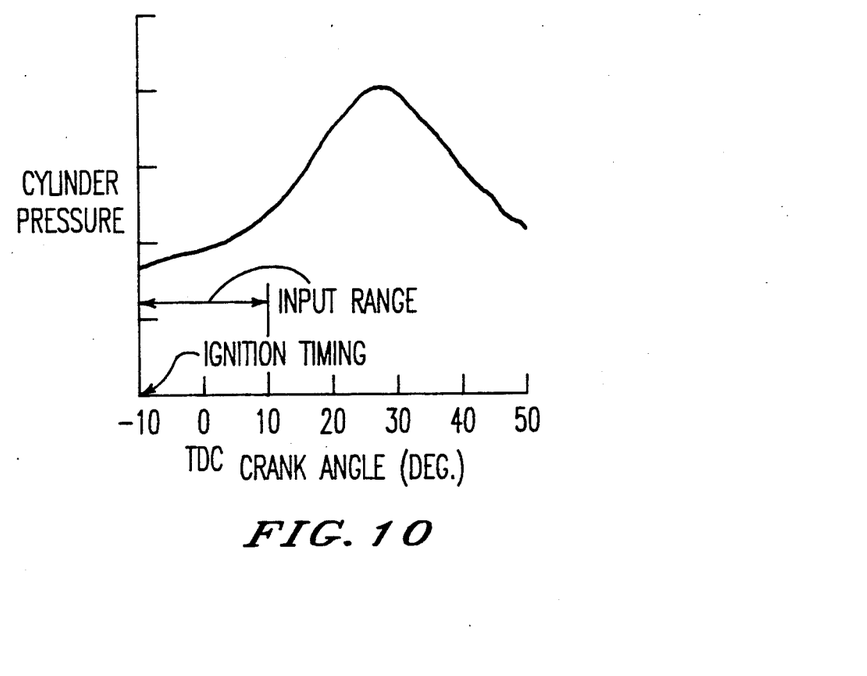
FIG. 10 shows the cylinder pressure of the cycle predicted as normal combustion by use of the unit of FIG. 5.

An example of knocking prediction and discrimination is given in FIGS. 9 and 10. FIG. 9 gives a cylinder pressure wave form predicting and discrimating knocking based on the data of input range. FIG. 10 is based on data over the same input range and is a wave form predicting normal combustion. In the case of FIG. 9 knocking occurs, but in the case of FIG. 10 there is no trace of the occurrence of knocking. In these cases the ignition timing is 10° of crank angle before TDC. Data for both cases are entered into the processing unit 4, the data being for cylinder pressures from 10 before TDC to 10° after TDC. Since knocking occurs at a point 20°–30° after TDC then an 10° after TDC there is not yet any occurrence of knocking. However in spite of this, with the first embodiment, knocking can be predicted and discriminated beforehand.

A combustion prediction and discrimination apparatus according to a second embodiment belongs to the fourth aspect of the invention. The processing unit is adjusted on the basis of typical cylinder pressures of misfire time and normal combustion time. By using the processing unit thus adjusted the occurrence of misfire is predicted and discriminated from the cylinder pressure in the initial combustion stage. This will be explained in detail below with reference to FIG. 11.

Figure 11:
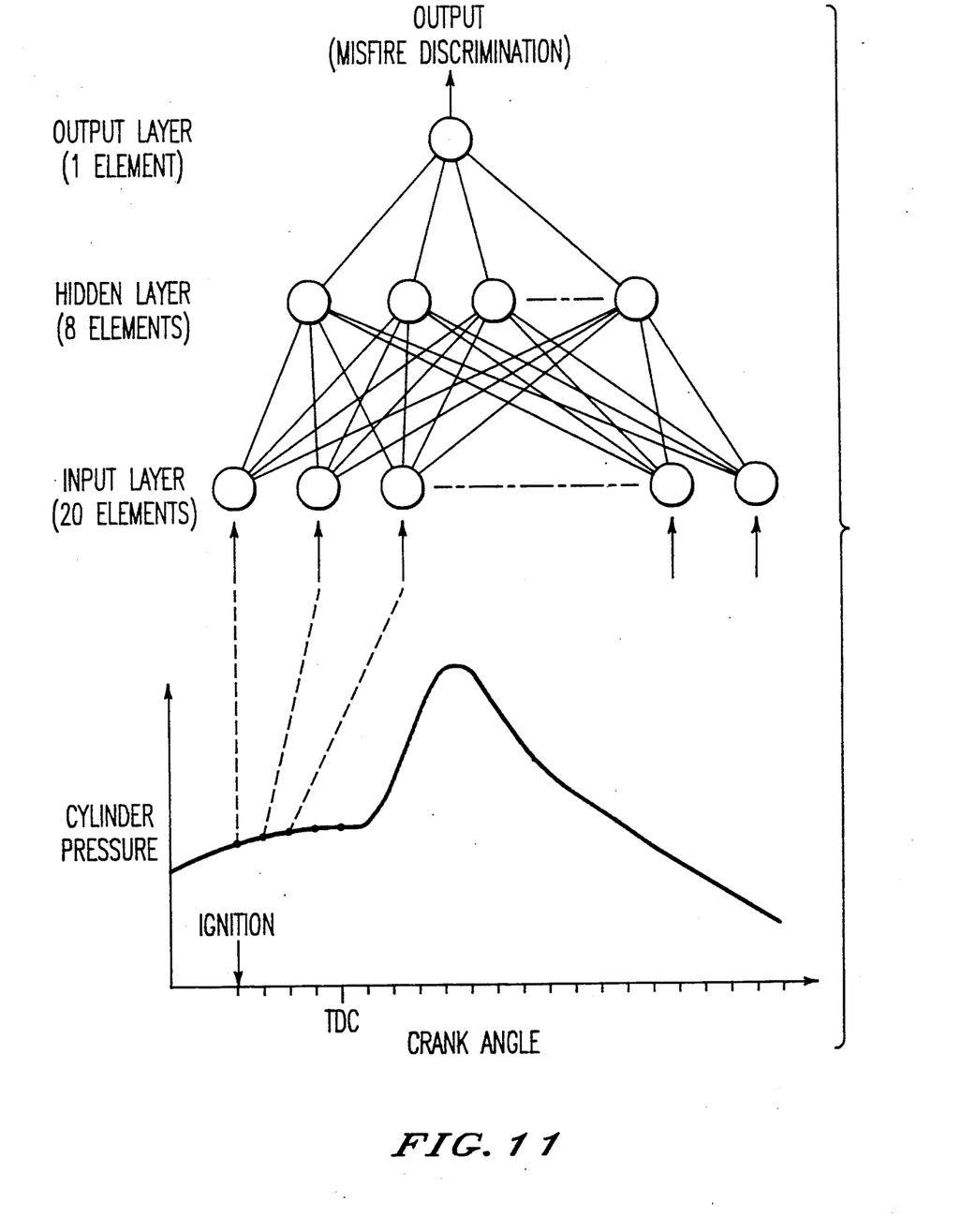
FIG. 11 schematically shows the elements of the processing unit used in the misfire prediction unit of the first preferred embodiment in the present invention.

In the second embodiment, as shown in FIG. 11, the input layer has 20 operational elements, the hidden layer has 8 operational elements, and the output layer has one operational element. Each element of the input layer inputs a signal to each of the elements of the hidden layer, and each element of the hidden layer inputs a signal to the output layer. From the initial point of spark ignition or fuel injection to 20° crank angle after, the cylinder pressures are input at 1° intervals as needed. The weight adjustment method and the operational processing method are the same as in the first preferred embodiment. The cylinder pressure used for processing unit adjustment is the cylinder pressure for the cases of misfire and normal combustion. The processing unit output is 1 in the case of misfire and is 0 in the case of normal combustion.

After the spark ignition or fuel injection, the cylinder pressure is input as required and operational processing is performed. The final output value on completion of operational processing is smaller than a certain value in the case of the normal combustion, but in the case of the misfire it is larger. Therefore, if the output value is larger than a certain value, misfire is predicted and discriminated. This misfire is suppressed before it can occur by a repeated spark from a separately provided spark device.

A combustion prediction and discrimination apparatus is characterized in that a processing unit is adjusted on the basis of a typical cylinder pressure of an A/F and by using the processing unit the A/F is predicted and discriminated from the cylinder pressure.

This will be explained in detail below with reference to FIG. 12.

Figure 12:
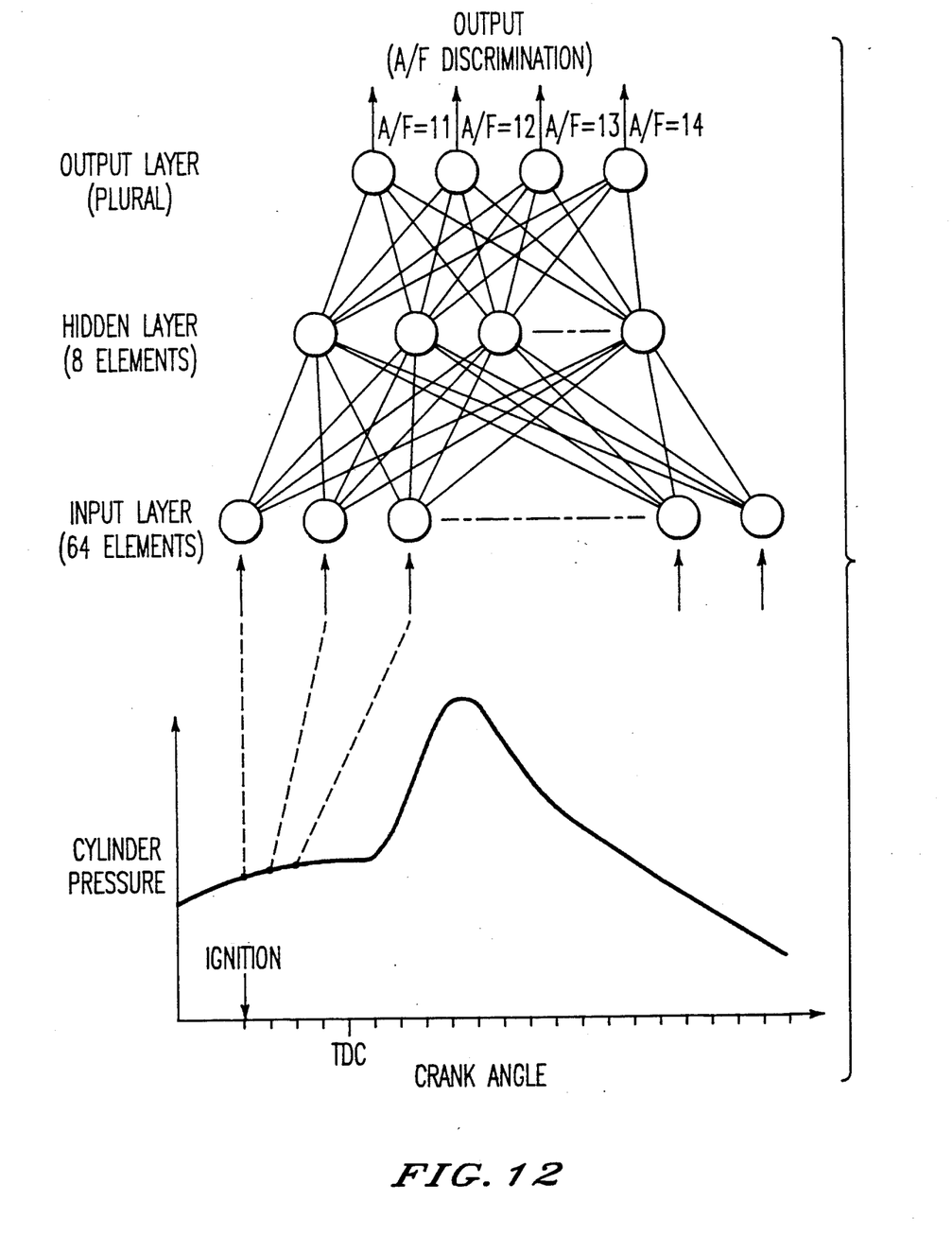
FIG. 12 schematically shows the elements of the processing unit used in an air/fuel ratio prediction device of the first preferred embodiment in the present invention.

In the third embodiment, as shown in FIG. 12, the input layer has 64 operational elements so that there is a large amount of cylinder pressure information to be input. The hidden layer has 8 operational elements, and the output layer has 4 operational elements corresponding to the range of the A/F to be predicted and discriminated. Each element of the input layer inputs a signal to each element of the hidden layer and each element of the hidden layer inputs a signal to each element of the output layer. The input values are input for each 1° after initial spark ignition up to 64° crank angle. This large range of input increases the A/F prediction and discrimination accuracy.

With the output, only the elements of the output layer that corresponds to the A/F of the cycle to be predicted and discriminated are acted thereon. The weight adjustment method and operational processing method are the same as the methods of the first embodiment. The cylinder pressure for operational processing adjustment uses the typical cylinder pressure of the A/F corresponding to each element of the output layer.

After input of the cylinder pressure of the cylinder for prediction and discrimination, the A/F can be predicted and discriminated before completion of combustion by studying the output values of the respective elements of the output layer.

By input of this resultant predicted A/F value into a separately provided A/F control device, the A/F can be controlled promptly and accurately.

A combustion prediction and discrimination apparatus according to a fourth embodiment is characterized in that a processing unit is adjusted on the basis of typical cylinder pressures of fuel-ignition timing or fuel-injection timing for maximum torque and fuel-ignition timing or fuel-injection timing advanced and retarded from this, and by using the processing unit thus adjusted it can be predicted and discriminated whether or not the ignition timing or the fuel-injection timing will result in the occurrence of maximum torque from the above cylinder pressures.

Figure 13:
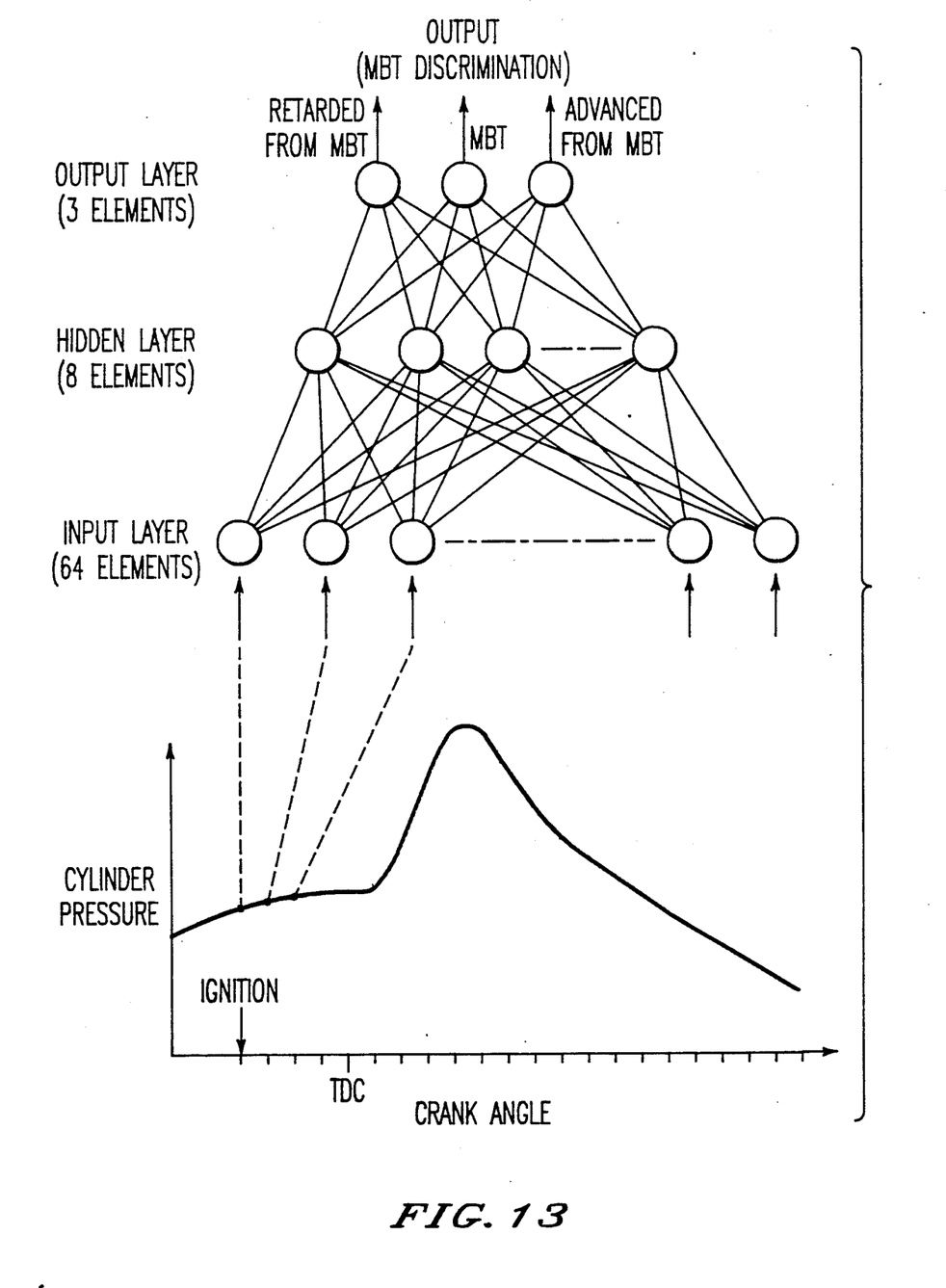
FIG. 13 schematically shows the elements of the processing unit used in the optimum ignition or fuel injection timing prediction device of the first preferred embodiment in the present invention.

In the fourth preferred embodiment, as shown in FIG. 13, the input layer has 64 operational elements, the hidden layer has 8 operational elements and the output layer 3 operational elements. Further each element of the input layer inputs a signal to each element of the hidden layer and each element of the hidden layer inputs a signal to each element of the output layer. From the initial point of the spark ignition or fuel injection to 64° crank angle after, the cylinder pressures are input at 1 intervals as needed. The weight adjustment method and operational processing methods are the same as in the first preferred embodiment. The cylinder pressures used for the processing unit adjustment are the cylinder pressures for the cases of ignition timing for maximum torque (MBT) and fuel-injection timing for maximum torque and timings advanced and retarded from this.

After input of the cylinder pressures for prediction and discrimination, by studying the output value of each output element, it can be predicted and discriminated before completion of combustion, if the ignition timing or fuel injection timing will give maximum torque, or is advanced or retarded from this timing.

The output of this prediction and discrimination is input to a separately provided ignition/fuel-injection timing control device to swiftly and accurately control the ignition or fuel-injection timing.

As for the above first to fourth preferred embodiments, all the operational circuits inside the processing unit are constructed as neural network computers, however, they are not limited to this construction and it is possible to use a device furnished with a Neuman type calculator for memory having the same ability as a neural-network computer.

What is claimed is:

1. A combustion prediction and discrimination apparatus for an internal combustion engine comprising:
   (a) means for detecting a crank angle to output a crank angle signal;
   (b) means for detecting a cylinder pressure to output a cylinder pressure signal;
   (c) means for selecting said cylinder pressure signal in correspondence with said crank angle signal detected in a part of the whole period of a burning condition to be predicted and discriminated; and
   (d) means for predicting and discriminating the burning condition having a network constituted by multi-connected operational elements, such that each of said multi-connected operational elements:
      (i) multiply each of a plurality of inputs to each of said multi-connected operational elements by weight;
      (ii) add the multiplied results; and
      (iii) output a non-linear transformation of the sum, wherein said weight is determined to cause the final output of said network to correspond to the burning condition to be predicted and discriminated on the basis of the information of said selected cylinder pressure signal, whereby the burning condition is predicted and discriminated on the basis of the magnitude of the final output obtained by one part of said cylinder pressure signal in correspondence with said crank angle signal.

2. A combustion prediction and discrimination apparatus for an internal combustion engine according to claim 1, wherein said combustion condition to be predicted and discriminated is at least one of the followings:
   a burning condition in which abnormal combustion occurs,
   a burning condition in which knocking occurs,
   a burning condition in which misfire occurs,
   a burning condition related to predetermined air-fuel ratio, and
   a burning condition in which maximum torque is given, and said weight is determined according to the burning conditions.

3. A combustion prediction and discrimination apparatus for an internal combustion engine according to claim 1, wherein on the basis of information of the cylinder pressure in correspondence with said crank angle over a part of period before the occurrence of abnormal combustion in a whole period of the burning condition in which the abnormal combustion occurs and information of the cylinder pressure in correspondence with said crank angle in the same part as the case of the occurrence of the abnormal combustion in the burning condition of normal combustion, said weight is determined to cause the final output of said network to correspond to each of the burning conditions; and
   by said means for predicting and discriminating the burning condition it is predicted and discriminated whether or not the abnormal combustion occurs on the basis of the magnitude of the final output obtained by input of the cylinder pressure signal in correspondence with said crank angle signal in the same period as said part of period.

4. A combustion prediction and discrimination apparatus for an internal combustion engine according to claim 1, wherein on the basis of information of the cylinder pressure in correspondence with said crank angle over a part of period before the occurrence of knocking in a whole period of the burning condition in which the knocking occurs and information of the cylinder pressure in correspondence with said crank angle in the same part as the case of the occurrence of the knocking in the burning condition of normal combustion, said weight is determined to cause the final output of said network to correspond to each of the burning conditions; and
   by said means for predicting and discriminating the burning condition it is predicted and discriminated whether or not the knocking occurs on the basis of the magnitude of the final output obtained by input of the cylinder pressure signal in correspondence with said crank angle signal in the same period as said part of period.

5. A combustion prediction and discrimination apparatus for an internal combustion engine according to claim 1, wherein on the basis of information of the cylinder pressure in correspondence with said crank angle over a part of period before the occurrence of misfire in a whole period of the burning condition in which the misfire occurs and information of the cylinder pressure in correspondence with said crank angle in the same part as the case of the occurrence of the knocking in the burning condition of normal combustion, said weight is determined to cause the final output of said network to correspond to each of the burning conditions; and
   by said means for predicting and discriminating burning condition it is predicted and discriminated whether or not the misfire occurs on the basis of the magnitude of the final output obtained by input of the cylinder pressure signal in correspondence with said crank angle signal in the same period as said part of period.

6. A combustion prediction and discrimination apparatus for an internal combustion engine according to claim 1, wherein on the basis of information of the cylinder pressure in correspondence with said crank angle over a part of period before completion of one burning condition in a whole period of said one burning condition, said weight is determined to cause the final output of said network to the burning condition of a predetermined air-fuel ratio; said weight is determined to cause the final output of said network to the predetermined air-fuel ratio; and
   by said means for predicting and discriminating burning condition it is predicted and discriminated whether or not the predetermined air-fuel ratio is given on the basis of the magnitude of the final output obtained by input of the cylinder pressure signal in correspondence with said crank angle signal in the same period as said part of period.

7. A combustion prediction and discrimination apparatus for an internal-combustion engine according to claim 1, wherein on the basis of information of the cylinder pressure in correspondence with said crank angle over a part of period before completion of one burning condition including ignition timing or fuel-injection timing in which maximum torque is given in a whole period of said one burning condition and information of the cylinder pressure in correspondence with said crank angle in the same part as the part above, before completion of one burning condition including ignition timing or fuel-injection timing advanced from the ignition timing or fuel-injection timing in which maximum torque is given and retarded therefrom said weight is determined to cause the final output of said network to each of the burning conditions; and
   by said means for predicting and discriminating burning condition it is predicted and discriminated whether or not the ignition timing or the fuel-injection timing in which maximum torque is given on the basis of the magnitude of the final output obtained by input of the cylinder pressure signal in correspondence with said crank angle signal in the same period as said part of period.

8. A combustion prediction and discrimination apparatus for an internal combustion engine according to claim 1, wherein said prediction and discrimination means has a neural network constructed with an input layer provided with a plurality of operational elements, each of which gives a plurality of outputs when a single signal is input;
   a hidden layer provided with a plurality of operational elements into which all the outputs from the input layer are input, each of which gives an output that is a non-linear transformation of a sum obtained from multiplying one of the outputs from the respective operational elements of the input layer by a weight and adding the results; and
   an output layer provided with at least one operation element which all the outputs from the hidden layer are input into, and gives an output that is a non-linear transformation of a sum obtained from multiplying one of the outputs from the respective operational elements of the hidden layer by a weight and adding the results; and on the basis of information of the cylinder pressure in correspondence with said crank angle over a part of a whole period in which burning condition is to be predicted and discriminated, said weight is determined to cause the final output of said network to the burning condition to be predicted and discriminated, and the combustion condition is predicted and discriminated depending on the magnitude of a final output obtained from input of said cylinder pressure signal in correspondence with said crank angle signal of a part of said whole period.

9. A combustion prediction and discrimination apparatus for an internal combustion engine according to claim 1, wherein on the basis of information of the cylinder pressure in correspondence with said crank angle over a part of a whole period of the burning condition to be predicted and discriminated and information of the cylinder pressure in correspondence with said crank angle over a part of a whole period of the burning condition compared with the burning condition to be predicted and discriminated, said weight is learned and determined to cause the final output of said network to correspond to each of the burning conditions by a back propagation method.

10. A combustion prediction and discrimination apparatus for an internal combustion engine according to claim 1, wherein said non-liner transformation is conducted by using a logistic ability.

11. A control apparatus for an internal combustion engine comprising:
 (a) means for detecting a crank angle to output a crank angle signal;
 (b) means for detecting a cylinder pressure to output a cylinder pressure signal;
 (c) means for selecting said cylinder pressure signal in correspondence with said crank angle signal detected in a part of the whole period of a burning condition to be predicted and discriminated; and
 (d) means for predicting and discriminating the burning condition having a network constituted by multi-connected operational elements, such that each of said multi-connected operational elements:
  (i) multiply each of a plurality of inputs to each of said multi-connected operational elements by weight;
  (ii) add the multiplied results; and
  (iii) output a non-linear transformation of the sum, wherein said weight is determined to cause the final output of said network to correspond to the burning condition to be predicted and discriminated on the basis of the information of said selected cylinder pressure signal, whereby the burning condition is predicted and discriminated on the basis of the magnitude of the final output obtained by one part of said cylinder pressure signal in correspondence with said crank angle signal; and
 means for controlling an internal combustion engine based on the discriminated results of said prediction discrimination means.

12. A control apparatus for an internal combustion engine according to claim 11, wherein on the basis of information of the cylinder pressure in correspondence with said crank angle over a part of period before the occurrence of abnormal combustion in a whole period of the burning condition in which the abnormal combustion occurs and information of the cylinder pressure in correspondence with said crank angle in the same part as the case of the occurrence of the abnormal combustion in the burning condition of normal combustion, said weight is determined to cause the final output of said network to correspond to each of the burning conditions; and
 by said means for predicting and discriminating burning condition it is predicted and discriminated whether or not the abnormal combustion occurs on the basis of the magnitude of the final output obtained by input of the cylinder pressure signal in correspondence with said crank angle signal in the same period as said part of period; and
 based on the discriminated results of said prediction and discrimination means an internal combustion engine is controlled by said control means so that the abnormal combustion does not occur.

13. A control apparatus of an internal combustion engine according to claim 11 wherein on the basis of information of the cylinder pressure in correspondence with said crank angle over a part of period before the occurrence of knocking in a whole period of the burning condition in which the knocking occurs and information of the cylinder pressure in correspondence with said crank angle in the same part as the case of the occurrence of the knocking in the burning condition of normal combustion said weight is determined to cause the final output of said network to correspond to each of the burning conditions; and
 by said means for predicting and discriminating burning condition it is predicted and discriminated whether or not the knocking occurs on the basis of the magnitude of the final output obtained by input of the cylinder pressure signal in correspondence with said crank angle signal in the same period as said part of period; and
 based on the discriminated results of said prediction and discrimination means the internal combustion engine is controlled by said control means so that the knocking does not occur.

14. A control apparatus for an internal combustion engine according to claim 11 wherein on the basis of information of the cylinder pressure in correspondence with said crank angle over a part of period before the occurrence of misfire in a whole period of the burning condition in which the misfire occurs and information of the cylinder pressure in correspondence with said crank angle in the same part as the case of the occurrence of the knocking in the burning condition of normal combustion said weight is determined to cause the final output of said network to correspond to each of the burning conditions; and
 by said means for predicting and discriminating burning condition it is predicted and discriminated whether or not the misfire occurs on the basis of the magnitude of the final output obtained by input of the cylinder pressure signal in correspondence with said crank angle signal in the same period as said part of period; and
 based on the discriminated results of said prediction and discrimination means the internal combustion engine is controlled by said control means so that the misfire does not occur.

15. A control apparatus of an internal combustion engine according to claim 11 wherein on the basis of information of the cylinder pressure in correspondence with said crank angle over a part of period before completion of one burning condition in a whole period of said one burning condition said weight is determined to cause the final output of said network to correspond to the burning condition of a predetermined air-fuel ratio; and by said means for predicting and discriminating burning condition it is predicted and discriminated whether or not the predetermined air-fuel ratio is given on the basis of the magnitude of the final output obtained by input of the cylinder pressure signal in correspondence with said crank angle signal in the same period as said part of period; and based on the discriminated results of said prediction and discrimination means the air-fuel ratio is controlled by said control means.

16. A control apparatus of an internal combustion engine according to claim 11 wherein on the basis of information of the cylinder pressure in correspondence with said crank angle over a part of period before completion of one burning condition including ignition timing or fuel-injection timing in which maximum torque is given and information of the cylinder pressure in correspondence with said crank angle in the same part as the part above before completion of one burning condition including ignition timing or fuel-injection timing advanced from the ignition timing or fuel-injection timing in which maximum torque is given and retarded therefrom said weight is determined to cause the final output of said network to correspond to each of the burning conditions; and by said means for predicting and discriminating burning condition it is predicted and discriminated whether or not the ignition timing or the fuel-injection timing in which maximum torque is given on the basis of the magnitude of the final output obtained by input of the cylinder pressure signal in correspondence with said crank angle signal in the same period as said part of period; and based on the discrimination results of said prediction and discrimination means the ignition/fuel-injection timing is controlled by said control means.

17. A control apparatus for an internal combustion engine according to claim 11 wherein said prediction and discrimination means has a neural network constructed with an input layer provided with a plurality of operational elements, each of which give a plurality of outputs when a single signal is input;

a hidden layer provided with a plurality of operational elements into which all the outputs from the input layer are input, each of which gives an output that is a non-linear transformation of a sum obtained from multiplying one of the outputs from the respective operational elements of the input layer by a weight and adding the results; and an output layer provided with at least one operational element which all the outputs from the hidden layer are input into and gives an output that is a non-linear transformation of a sum obtained from multiplying one of the outputs from the respective operational elements of the hidden layer by a weight and adding the results; and on the basis of information of the cylinder pressure in correspondence with said crank angle over a part of a whole period in which burning condition is to be predicted and discriminated said weight is determined to cause the final output of said network to correspond to the burning condition to be predicted and discriminated; and the combustion condition is predicted and discriminated depending on the magnitude of a final output obtained from input of said cylinder pressure signal in correspondence with said crank angle signal of a part of said whole period.

18. A control apparatus for an internal combustion engine according to claim 11 wherein on the basis of information of the cylinder pressure in correspondence with said crank angle over a part of a whole period of the burning condition to be predicted and discriminated and information of the cylinder pressure in correspondence with said crank angle over a part of a whole period of the burning condition compared with the burning condition to be predicted and discriminated said weight is determined to cause the final output of said network to correspond to each of the burning conditions by learning a back propagation method.

19. A control apparatus for an internal combustion engine according to claim 11, wherein said non-liner transformation is conducted by using a logistic ability.

* * * * *